Dec. 26, 1950  A. R. PEZZILLO, JR  2,535,695

MOTOR PUMP UNIT

Filed June 7, 1950  2 Sheets-Sheet 2

INVENTOR
Albert R. Pezzillo, Jr.
BY
Herbert S. Fairbanks
ATTORNEY

Patented Dec. 26, 1950

2,535,695

UNITED STATES PATENT OFFICE 2,535,695

MOTOR PUMP UNIT

Albert R. Pezzillo, Jr., Philadelphia, Pa.

Application June 7, 1950, Serial No. 166,595

6 Claims. (Cl. 103—87)

The object of this invention is to devise a novel construction and arrangement of a combined motor and pump which can be economically manufactured and assembled; which can have a straight line connection in a pipe line; and which, if desired, can be submerged in the fluid being impelled.

A further object of the invention is to dispense with the conventional shaft for mounting the rotor of the motor and to mount the rotor directly on one of the sections of a housing common to the motor and the pump.

A further object of the invention is to devise a novel manner of mounting the stator of the motor and insulating it from the fluid being impelled.

A further object of the invention is to devise a novel construction of an impeller; novel means for mounting it and for connecting it to the rotor to form a rotor-impeller unit.

A further object of the invention is to devise a novel construction of housing sections one of which forms an intake venturi to lead fluid to the impeller mounted in the other housing section at the discharge end of the pump.

With the foregoing and other objects in view, as will hereinafter clearly appear, my invention comprehends a novel construction and arrangement of a combined motor and pump having a common housing, and adapted for a straight line connection in a pipe line, and, if desired, for being submerged in the fluid being impelled.

My invention further comprehends a novel housing; novel means for mounting the rotor on a section of the housing; novel means for mounting and isolating the stator from the fluid being impelled, and a novel impeller.

For the purpose of illustrating the invention, I have shown in the accompanying drawings a preferred embodiment of it which, in practice, will give satisfactory and reliable results.

Similar numerals of reference indicate corresponding parts.

Figure 1:
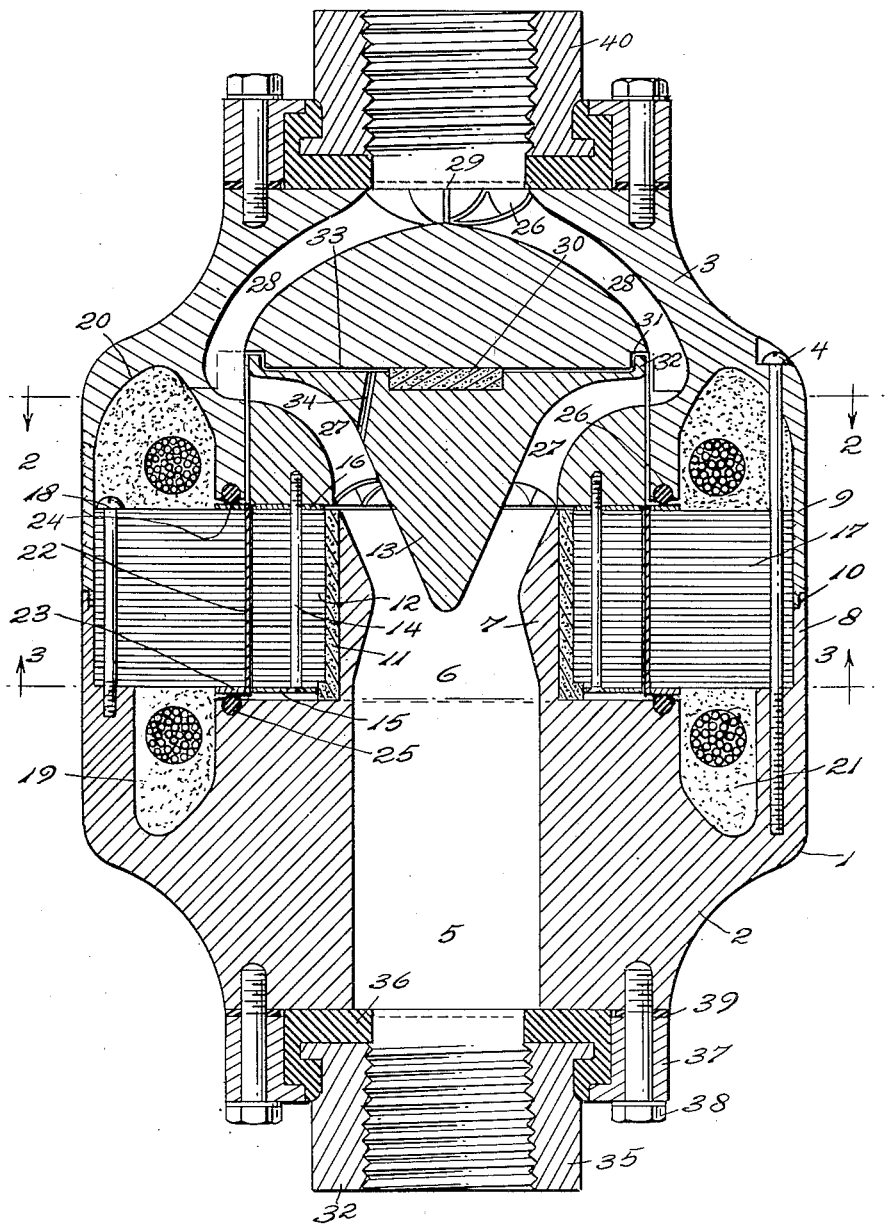
Figure 1 is a sectional elevation of a combined motor and pump, embodying my invention.
Figure 2:
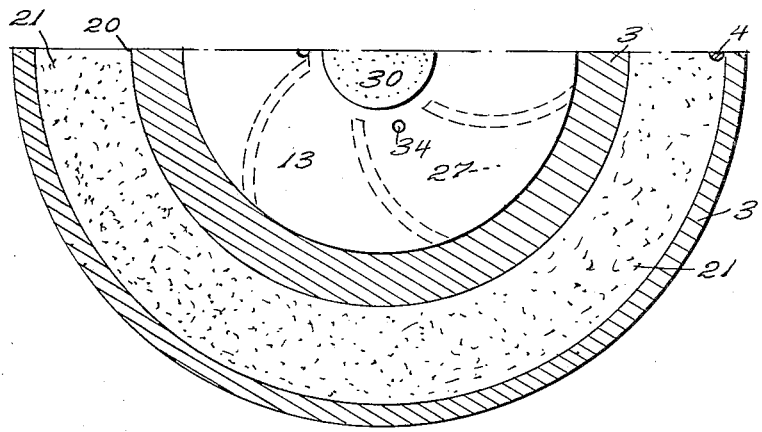
Figure 2 is a section on line 2—2 of Figure 1 with the central portion of the section line lying in the space between the impeller and discharge section.
Figure 3:
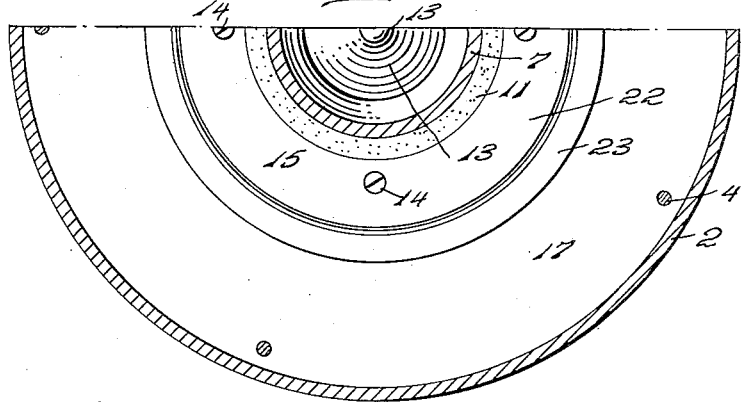
Figure 3 is a section on line 3—3 of Figure 1.
Figure 4:
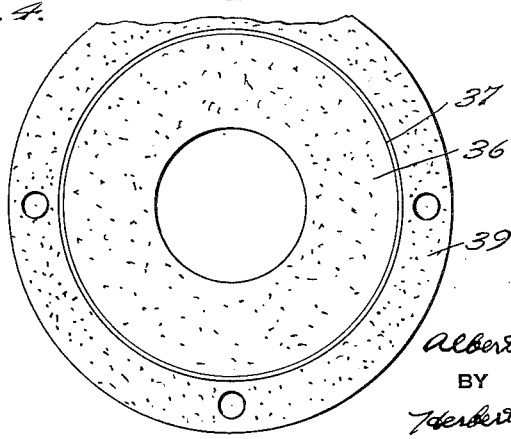
Figure 4 is an end elevation of a coupling seen in Figure 1.

Referring to the drawings:

The motor and the pump are mounted in a common housing 1, comprising an intake section 2 and discharge section 3 secured in assembled condition by fastening devices 4. The section 2 is the intake section and has an intake passage 5 leading to a venturi 6, formed within a central tubular extension 7 of the intake section 2. The section 2 has an annular sleeve 8 which is connected with an annular sleeve 9 of the section 3 by a step 10.

The tubular extension 7 has a bearing sleeve 11 mounted on it and this sleeve has an outwardly extending flange at its inner end. The bearing sleeve is preferably a carbon sleeve and carries a rotor 12 connected to an impeller 13 by fastening devices 14 which pass through end plates or rings 15 and 16 and are threaded into the impeller.

A stator 17 has its laminations fixed to the housing section 2 by fastening devices 18 in the form of bolts. The windings of the stator are received in chambers 19 and 20 in the housing and are embedded in insulating material 21. The stator is isolated and insulated from the fluid being impelled by a non-magnetic sleeve 22 having high electrical resistance characteristics. The sleeve 22 has end rings 23 and 24 fixed to it and these rings bear respectively against annular sealing gaskets 25 and 26 set into their respective housing sections, thereby insulating the stator from the impelled fluid.

The impeller is coned at its intake end and has impeller passages 27 which lead from the venturi 6 and curve forwardly and outwardly to the outer periphery of the impeller to communicate with forwardly converging diffuser passages 28 having a central discharge or outlet at 29 in the discharge section. It will thus be clear that the housing has an inlet as at 5 and a discharge or outlet at 29. A centrally disposed carbon bearing 30 is between the impeller and the housing section 3 and may be located in the impeller as shown or in the housing section 3.

The section 3 has an annular groove 31 to receive a forwardly projecting annular flange 32 at the outer periphery of the impeller to form a restricted passage 33 between the impeller and the housing section 3. Passages 34 in the impeller from its high pressure side to its low pressure side contribute to hydraulically balance the rotor-impeller unit.

The combined motor and pump can be connected in a pipe line in any desired manner, and as shown a threaded coupling 35 has a gasket 36 molded around and interlocked with its side walls and extends over its inner face. A clamping ring 37 is secured by bolts 38 to its housing section, a separate gasket 39 being employed for the clamping ring. A coupling 40 of similar construction is at the opposite end of the housing.

In the operation, the fluid in the intake passage 5 passes to the venturi 6, through the impeller passages 27 and diffuser passages 28 to the outlet of the motor pump unit.

The electrical connections for the motor are conventional.

The intake venturi has its walls converging to a point near the intake end of the impeller at the central portion thereof and the walls then merge into diverging walls. Thus the passage in the venturi converges towards its central portion and then diverges to communicate with the intake ends of the impeller passages.

Special attention is directed to the omission of the conventional shaft and its mounting which carries the impeller. The rotor in this invention is mounted on an extension of a housing section by means of a bearing sleeve, and the rotor is connected with the impeller to form a unit of structure therewith. There is an advantage in assemblying the stator in one housing section so that the rotor-impeller unit and the other housing section can be assembled with the stator by a straight line movement. Upon removal of the bolts 4, the housing sections can be taken apart and the rotor-impelling unit removed for inspection or other purposes.

The end rings 23 and 24 are non-magnetic and cooperate with the sealing gaskets 25 and 26 to isolate and insulate the stator windings from the fluid being impelled.

Having thus described my invention, what I claim as new and desire to secure by Letters Patent is:

1. In a motor pump unit, a sectional housing having an intake section with an inlet and a discharge section with an outlet, said intake section having at the end remote from the inlet a centrally located tubular extension with a Venturi shaped passage through it and communicating by a passage with the inlet, a rotor in telescopic relationship with said extension and revoluble on it, said discharge section having an annular chamber open at one end having diffuser passages leading from the chamber to the outlet, the open end of the chamber being located in juxtaposition to the tubular extension of the intake section an impeller in said chamber, fixed to the rotor and having impeller passages leading from the Venturi shaped passages to pass fluid to the diffuser passages, a stator within the housing concentric with the rotor, and means to seal the stator from the fluid being impelled.

2. The construction defined in claim 1, wherein the sealing means comprises a non-magnetic cylinder surrounded by the stator, rings fixed to the cylinder and contacting the stator, and sealing gaskets contacting the rings and juxtaposed walls of the housing sections.

3. In a motor pump unit, a housing having an intake section with an inlet and a discharge section with an outlet, said intake section having at the end remote from the inlet a centrally located tubular extension with a Venturi shaped passage through it and communicating with the inlet, a rotor in telescopic relationship with and mounted on said extension, a sleeve bearing carrying the rotor and serving also as a thrust bearing, said discharge section having a chamber with an open end located in juxtaposition to the tubular extension and diffuser passages leading to the outlet, an impeller in said chamber, fixed to the rotor and having impeller passages to pass fluid from the Venturi shaped passage to said diffuser passages, a thrust bearing between the impeller and the discharge section, and a stator within the housing concentric with the rotor and sealed from the fluid being impelled.

4. The construction defined in claim 3, wherein the impeller has a central portion projecting into the Venturi shaped passage to form an annular passage leading to the impeller passages.

5. In a motor pump unit, a housing having an intake section with an inlet and a discharge section with an outlet, the intake section having at the end remote from the inlet a tubular extension having a Venturi shaped passage communicating with the inlet, a rotor in telescopic relationship with said extension and having a sleeve bearing mounted on said extension, said discharge section having an impeller receiving chamber having an opened end located in juxtaposition to the tubular extension and having passages leading therefrom to the outlet, an impeller in said chamber fixed to the rotor and having passages to pass fluid from the Venturi shaped passage to the passages in the discharge section, said impeller having an annular flange and said discharge section having an annular recess to receive the flanges and forming a restricted passage between them communicating with the discharge section passages, said impeller having passages through it to relieve high pressure from the restricted passage to the low pressure side of the impeller, a stator within the housing and concentric with the rotor, and means to seal the stator from the fluid being impelled.

6. In a motor pump unit, a housing having an intake section with an inlet and a discharge section with an outlet, the intake section having remote from the inlet a centrally located tubular extension with a Venturi shaped passage in communication with the inlet and having an annular chamber surrounding the extension, a stator within the annular chamber of the intake section and having laminations fixed to the intake section, a rotor surrounded by the stator, concentric therewith and in telescopic relationship with said extension, a bearing for said rotor, a non-magnetic cylinder surrounded by the stator, rings at opposite ends of the laminations and fixed to the non-magnetic cylinder, an annular sealing gasket between the intake section and one of said rings, said discharge section having a chamber open at one end with the open end located in juxtaposition to the tubular extension and having passages from the chamber to the outlet, an impeller in the chamber of the discharge section, fixed to the rotor and having impeller passages leading from the Venturi shaped passage to the outlet, said discharge section being recessed to receive a portion of the stator, a thrust bearing between the impeller and the discharge section, and a sealing gasket compressed between the discharge section and the other of said rings when the housing sections are brought together.

ALBERT R. PEZZILLO, Jr.

(References on following page)

REFERENCES CITED

The following references are of record in the file of this patent:

UNITED STATES PATENTS

| Number | Name | Date |
|---|---|---|
| 1,405,959 | Woock | Feb. 7, 1922 |
| 1,739,000 | Jardao | Dec. 10, 1929 |
| 2,225,338 | Geiss | Dec. 17, 1940 |
| 2,272,469 | Lannert | Feb. 10, 1942 |
| 2,274,987 | Lung | Mar. 3, 1942 |
| 2,312,848 | Pezzillo | Mar. 2, 1943 |
| 2,319,730 | Garraway | May 18, 1943 |
| 2,454,390 | Jacobsen | Nov. 23, 1948 |

FOREIGN PATENTS

| Number | Country | Date |
|---|---|---|
| 28,980 | Great Britain | Dec. 23, 1948 |